(12) United States Patent
Fadili et al.

(10) Patent No.: US 9,143,621 B2
(45) Date of Patent: Sep. 22, 2015

(54) COMPUTATION SAVING ECHO CANCELLER FOR A WIDE BAND AUDIO SIGNAL

(75) Inventors: Moulay Fadili, Colombes (FR); François Pinier, Colombes (FR)

(73) Assignee: Alcatel Lucent, Boulogne-Billancourt (FR)

(*) Notice: Subject to any disclaimer, the term of this patent is extended or adjusted under 35 U.S.C. 154(b) by 28 days.

(21) Appl. No.: 14/007,864

(22) PCT Filed: Jan. 11, 2012

(86) PCT No.: PCT/EP2012/050374
§ 371 (c)(1),
(2), (4) Date: Oct. 8, 2013

(87) PCT Pub. No.: WO2012/139780
PCT Pub. Date: Oct. 18, 2012

(65) Prior Publication Data
US 2014/0023188 A1    Jan. 23, 2014

(30) Foreign Application Priority Data
Apr. 14, 2011   (EP) .................................... 11305441

(51) Int. Cl.
H04M 9/08   (2006.01)
H04B 3/23   (2006.01)

(52) U.S. Cl.
CPC *H04M 9/082* (2013.01); *H04B 3/23* (2013.01)

(58) Field of Classification Search
None
See application file for complete search history.

(56) References Cited

U.S. PATENT DOCUMENTS

| | | |
|---|---|---|
| 2005/0157866 A1 | 7/2005 | Marton et al. |
| 2007/0041575 A1 | 2/2007 | Alves et al. |
| 2008/0151791 A1* | 6/2008 | LeBlanc ........................ 370/291 |
| 2009/0103712 A1* | 4/2009 | Frauenthal et al. ....... 379/406.12 |
| 2011/0064213 A1* | 3/2011 | Deng et al. ............... 379/406.08 |

FOREIGN PATENT DOCUMENTS

| | | |
|---|---|---|
| WO | WO-2005/062595 A1 | 7/2005 |
| WO | WO-2007/021722 A2 | 2/2007 |

OTHER PUBLICATIONS

International Search Report PCT/ISA/210 for PCT/EP2012/050374 dated Mar. 2, 2012.

* cited by examiner

*Primary Examiner* — Fan Tsang
*Assistant Examiner* — Jeffrey Lytle
(74) *Attorney, Agent, or Firm* — Harness, Dickey & Pierce, P.L.C.

(57) ABSTRACT

A canceller splits a signal, transmitted from a near end terminal (ET) to a far ET, into a sub-sampled signal corresponding to a higher frequency sub-band of the signal transmitted to the far ET, and a sub-sampled signal corresponding to a lower frequency sub-band of the signal transmitted to the far ET; and splits a signal received from a far ET into a sub-sampled signal corresponding to a higher frequency sub-band of the signal received from the far ET, and a sub-sampled signal corresponding to a lower frequency sub-band of the signal received from the far ET. The canceller includes a first adaptive filter for filtering the sub-sampled signal corresponding to the lower frequency sub-band, a second adaptive filter for filtering the sub-sampled signal corresponding to the higher frequency sub-band, and controls the adaptation of the first and second adaptive filters so that these two adaptations are never simultaneous.

5 Claims, 3 Drawing Sheets

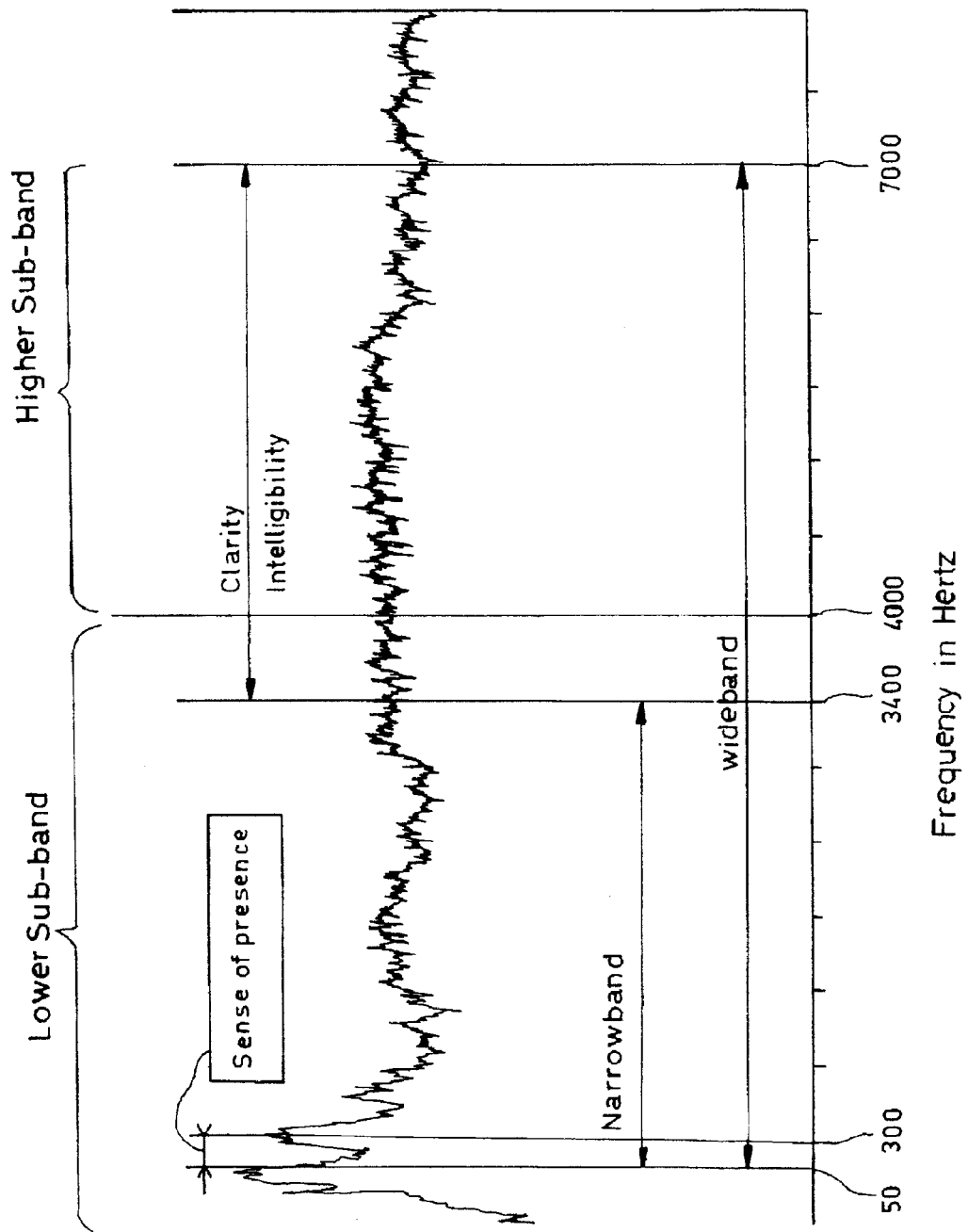
FIG_2

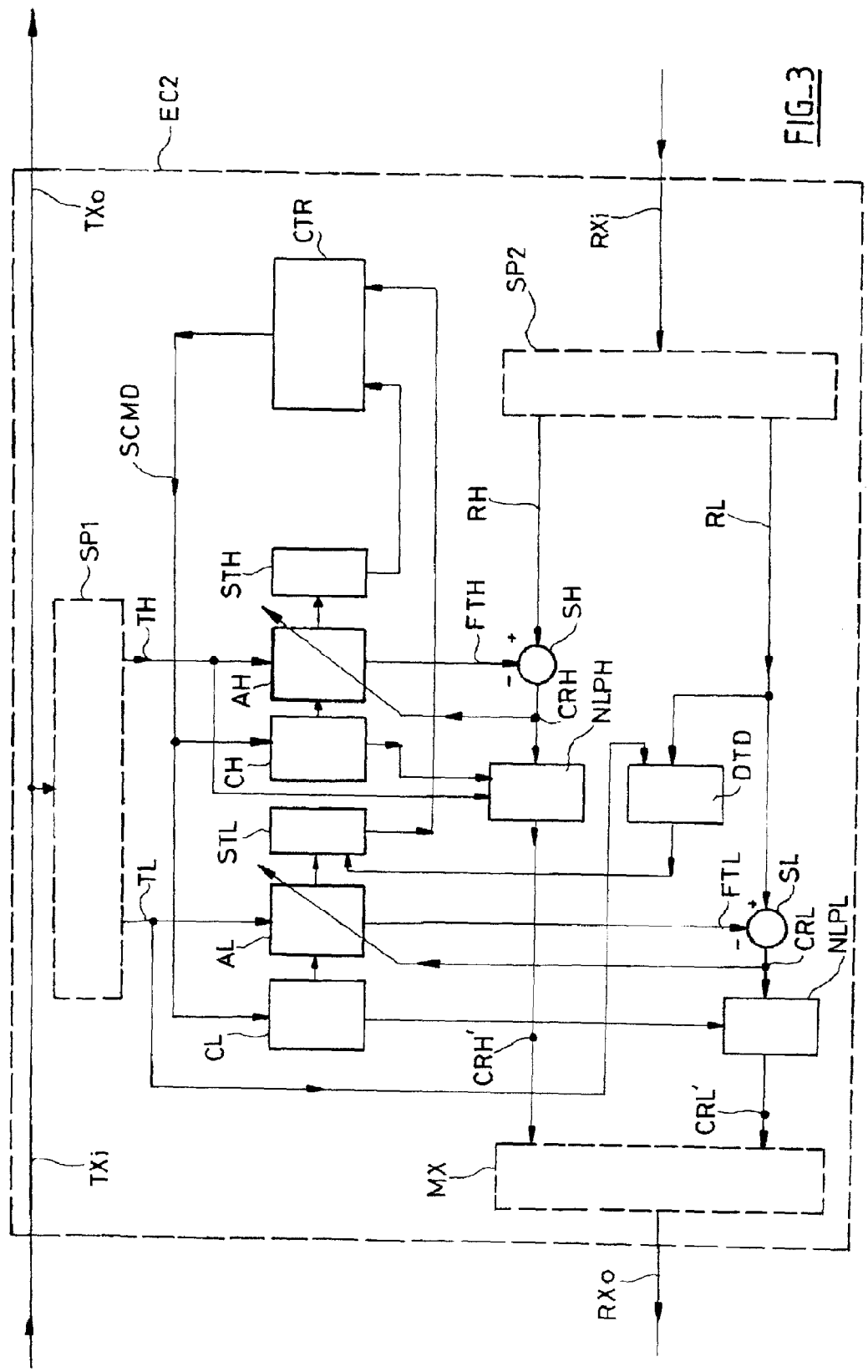
FIG_3

COMPUTATION SAVING ECHO CANCELLER FOR A WIDE BAND AUDIO SIGNAL

This application is the national phase under 35 U.S.C. §371 of PCT International Application No. PCT/EP2012/050374 which has an International filing date of Jan. 11, 2012, which claims priority to European patent application number 11305441.5 filed Apr. 14, 2011; the entire contents of each of which are hereby incorporated by reference.

BACKGROUND OF THE INVENTION

1. Field of the Invention

The present invention generally relates to an echo canceller that can be used in a telecommunication network, for instance in a softphone, or a gateway. It peculiarly concerns an echo cancelling for a wide band audio signal. The present invention could be also applied for audio signals at sampling rate higher than 16000 Hz (examples: 22050 Hz, 32000 Hz, 44100 Hz ... ).

The echo cancellation is required for audio communication over Internet protocol. The use of wide band audio implies the use of wide band echo cancellation. In order to achieve the same effectiveness as narrow band echo cancellation, in terms of quality, the wide band echo cancellation needs a greater computation volume, i.e. a greater number of millions of instructions per second (MIPS), by a factor four. It means that, if a narrow band echo cancellation requires n MIPS, a wide band echo cancellation using the same technology will require 4×n MIPS. In general, when the band width is doubled the computing volume of echo cancellation is quadrupled.

In a softphone, or a gateway, the echo cancelling is provided by an echo canceller constituted by a signal processor running echo cancelling software. As an audio codec used for wide band telephony requires more computation volume than an audio codec for narrow band telephony, the overall computation volume of a softphone is very high. In addition, a softphone usually runs with other applications at the same time in a personal computer. So it is important to reduce the computation volume of the echo canceller, while providing a high level of audio quality, peculiarly in hand free mode.

This invention deals with the problem of computation volume of echo cancellation, and proposes an echo canceller to reduce this volume without reducing the quality of the audio signal.

2. Description of the Prior Art

There are several known methods to reduce the computation volume of wide band echo cancellation. These methods are based on sub-band decomposition, or frequency domain computation. But these methods introduce:

- An extra delay in the communication, which increases with the number of sub-bands. This delay is important for more than two sub-bands.
- A degradation of audio quality (for more than two sub-bands). This degradation is due to an imperfect separation of the sub-bands (because no filter is ideal).

There are also known methods avoiding these drawbacks. These methods are based on sub-band decomposition and sub-band filter adaptation. They consist in synthesizing a full band filter by using two sub-band filters. These methods are called delay less decomposition. The document WO 2007/021722 describes such a method. They are not good enough because:

- They imply the use of Fast Fourier Transforms (FFT) and inverse Fast Fourier Transforms (iFFT) to synthesize the full band filter. They need extra computation because the computation of FFT and iFFT must be done with floating point coding of numbers.
- They introduce a problem of quality, due to the synthesis of the full band filter, peculiarly with fixed point coding of numbers computing.

Among known methods based on sub-band decomposition, decomposition in two sub-bands enables to reduce the computing by a factor of about 2 (less than 2 in fact). The document WO 2005/062595 describes such a method. For the wide band audio signal, this decomposition does not introduce a subjective degradation of the quality. But it would be desirable to reduce the computation volume more significantly.

FIG. 1 represents the functional diagram of an example EC1 of such a two sub-band echo canceller according to the prior art. This example comprises:

An input receiving a signal TXi from the near end terminal.

An output sending a signal TXo to the far end terminal, this signal being identical to the signal TXi received from the near end terminal.

An input receiving a signal RXi composed of a vocal signal captured by the far end terminal and an echo originating from the near end terminal and coming back via the far end terminal.

An output sending a signal RXo to the near end terminal. The echo is cancelled or at least attenuated in this signal Rxo.

A splitter device SP1 for separating the signal TXi into two sub-sampled signals TH and TL respectively corresponding to a higher sub-band and a lower sub-band.

Two adaptive filters AL and AH for respectively filtering the two signals TH and TL respectively corresponding to the higher sub-band and the lower sub-band. These filters supply filtered signals FTL and FTH respectively.

A splitter device SP2 for separating the signal RXi into two sub-sampled signals RH and RL respectively corresponding to the higher sub-band and the lower sub-band.

A first subtractor SH for subtracting the signal FTH to the signal RH, the resulting signal being a corrected signal CRH for the higher sub-band.

A second subtractor SL for subtracting the signal FTL to the signal RL, the resulting signal being a corrected signal CRL for the lower sub-band.

A mixer device MX for constituting the signal RXo by up-sampling, combining and smoothing the two corrected signals CRH and CRL.

The two adaptive filters AL and AH are respectively controlled by the corrected signal CRL and CRH so that these corrected signals are minimized, i.e. so that the echo is minimized in each of the sub-bands. For instance, the higher sub-band spreads from 4000 Hz to 7000 HZ; and the lower sub-band spreads from 50 Hz to 4000 HZ.

The splitter device SP1 comprises a low-pass filter LP1 and a high pass filter HP1, associated respectively with two sub-sampling devices LSS1 and HSS1. One out of two successive samples of each of the two filtered signals, respectively supplied by the low-pass filter LP1 and the high pass filter HP1, is dropped for constituting respectively the signals TL and TH.

The splitter device SP2 comprises a low-pass filter LP2 and a high pass filter HP2, associated respectively with two sub-sampling devices LSS2 and HSS2 for generating respectively the signals RL and RH. One out of two successive samples of each of the two filtered signals, respectively supplied by the low-pass filter LP2 and the high pass filter HP2, is dropped for constituting respectively the signals RL and RH.

The mixer device MX comprises:
two up-samplers HUS and LUS for respectively up-sampling the corrected signals CRH and CRL, by duplicating each sample;
a high pass filter HP3 for filtering the signal restituted by the up-sampler HUS;
a low pass filter LP3 for filtering the signal restituted by the up-sampler LUS;
an adder device AO for adding the two filtered signals respectively supplied by the filters HP3 and LP3, and generating the output signal RXo to be supplied to the near end terminal.

The computation volume for removing echo in each sub-band (in this example) is reduced by a factor four, due to a down-sampling factor equal to two. But there is an additional cost for decomposing the signals into two sub-bands and then synthesizing a complete signal. So the cost of this solution is:

2×(Full Band cost)/4+Decomposition Cost+Synthesis Cost

The cost of this known solution is slightly greater than half the cost of a full band solution, because the decomposition cost and synthesis cost are very low with respect to the cost of echo filtering and adaptation. The same known method can be used for n band decomposition.

For the wide band audio signal, this decomposition does not introduce a subjective degradation of the quality. But it would be desirable to reduce the computation volume more significantly.

Thus, there is a need to provide a technical solution for further reducing the computing volume of the echo cancellation for wide band audio communication. This point is particularly important for mobile device and also multichannel echo canceller used on gateways. This can be solved by the echo canceller according to the invention.

SUMMARY OF THE INVENTION

The object of the invention is an echo canceller comprising:
means for splitting a signal transmitted from a near end terminal to a far end terminal, into a sub-sampled signal corresponding to a higher frequency sub-band of the signal transmitted to the far end terminal, and a sub-sampled signal corresponding to a lower frequency sub-band of the signal transmitted to the far end terminal,
means for splitting a signal received from a far end terminal into a sub-sampled signal corresponding to a higher frequency sub-band of the signal received from the far end terminal, and a sub-sampled signal corresponding to a lower frequency sub-band of the signal received from the far end terminal,
a first adaptive filter for filtering the sub-sampled signal corresponding to the lower frequency sub-band of the signal transmitted to the far end terminal, and restituting a first filtered signal,
a second adaptive filter for filtering the sub-sampled signal corresponding to the higher frequency sub-band of the signal transmitted to the far end terminal, and restituting a second filtered signal,
first means for subtracting the first filtered signal from the sub-sampled signal corresponding to a lower frequency sub-band out of the signal received from a far end terminal, and supplying a first corrected signal,
second means for subtracting the second filtered signal from the sub-sampled signal corresponding to a higher frequency sub-band of the signal received from a far end terminal, and supplying a second corrected signal, and for controlling the adaptive filters so that the filtered signals supplied by the first and the second adaptive filters are respectively minimized,
means for respectively processing the first and the second corrected signals and supplying two processed corrected signal respectively corresponding to the lower and the higher frequency sub-band,
means for mixing the two process corrected signals and up-sampling the resulting signal, in order to constitute an output signal to be supplied to a near end terminal;
characterized in that it further comprises control means that control the adaptation of the first adaptive filter and the adaptation of the second adaptive filter so that these two adaptations are never simultaneous.

An echo canceller according to the invention exploits the nature of voice signal: It decomposes this voice signal in two frequency sub-bands; and it controls the adaptation of the filters corresponding to the two sub-bands, in a way that avoids having adaptation of the two filters simultaneously. As the computation volume for the adaptation of each of the two filters is very high in comparison with the computation for filtering and other functions of echo cancellation, the global computation volume is drastically reduced.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 2 shows the spectrum of a typical audio signal that can found in a wide band telephony channel.

FIG. 3 represents a block diagram of an embodiment of the echo canceller according to the invention.

DETAILED DESCRIPTION OF THE PREFERRED EMBODIMENTS

Figure 1:
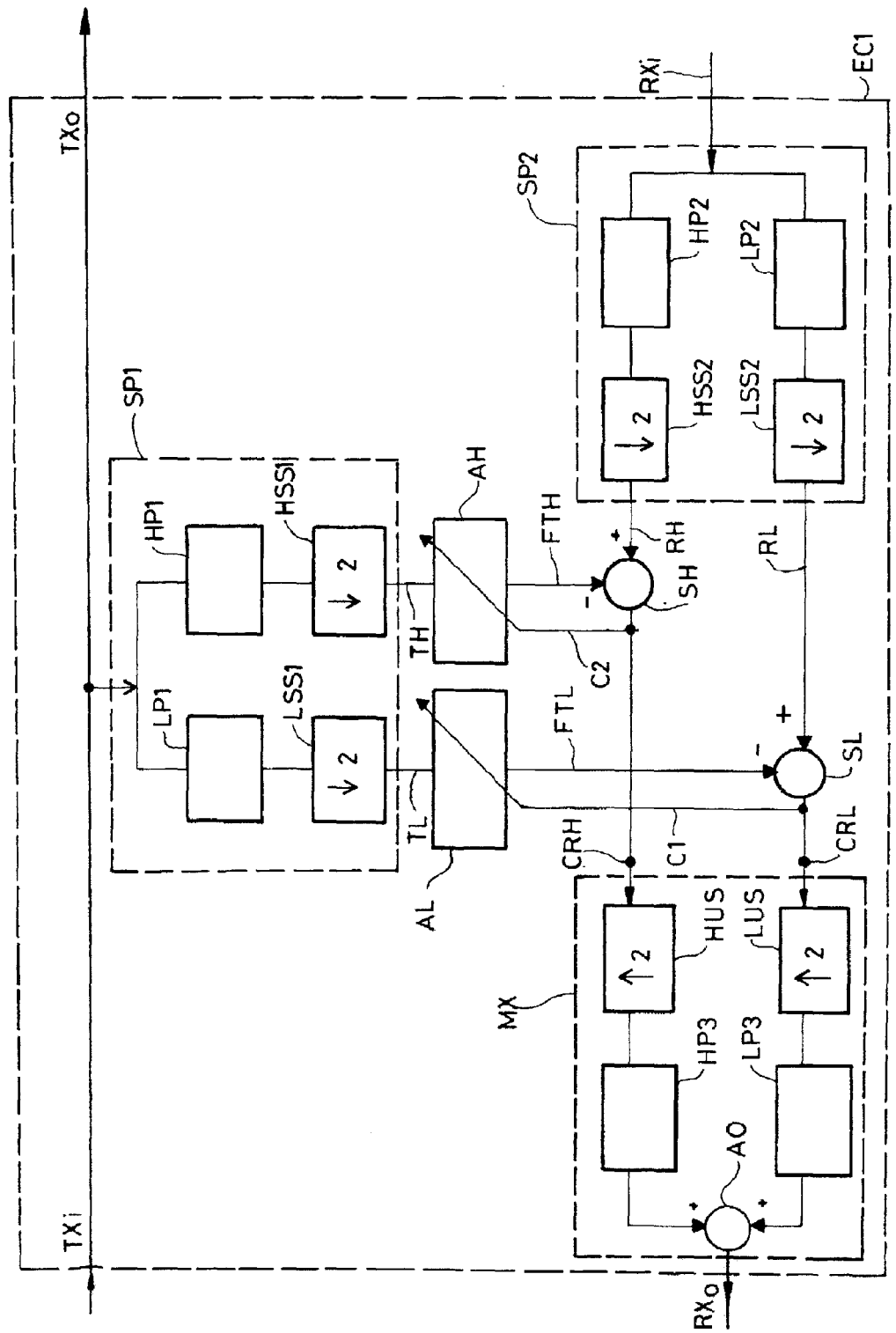
FIG. 1, described above, represents the functional diagram of an example of a two sub-band echo canceller according to the prior art.

FIG. 2 shows the spectrum of a typical audio signal that can found in a wide band telephony channel. It spreads from 0 to 8000 Hz. Classical telephony transmits a narrow band 300-3400 Hz. Wide band telephony transmits the band 50-7000 Hz. For splitting the echo cancelling process, we will consider a lower sub-band LS covering 50-4000 Hz and a higher sub-band HS covering 4000-7000 Hz. The greatest part of the energy of this telephony signal is located in the lower sub-band LS (50-3400 Hz). The lower sub-band LS carries the main part of the audio information. More peculiarly, the band 50-300 Hz provides a sense of presence. The energy of the signal of the higher sub-band HS (4000-8000 Hz) is low, and this part of the signal is similar to noise, but it contributes to enhance the clarity and intelligibility of the restituted audio.

As the audio signal at 4000 Hz, and higher, is similar to noise and the energy around this frequency is low, regarding the energy in the band 50-3400 Hz, the decomposition, into two sub-bands 50-4000 Hz and 4000-7500 Hz, and the synthesis of a restituted signal have little impact on the quality of the audio signal. The basic idea of the invention is to focus more on the processing of lower frequencies than on the processing of higher frequencies, thus saving computation volume. The adaptation of the lower band adaptive filter of the echo cancellation is critical. The adaptation of the higher band adaptive filter of the echo cancellation is less important.

According to the invention, during the convergence time, only the filter of the lower sub-band is adapted. During this convergence time, no adaptive filter but a simple echo suppressor is applied to the higher sub-band. Once the filter of the lower sub-band has reached acceptable quality, this filter is frozen, and the adaptation of the filter for the higher sub-band is enabled. An echo suppressor works by detecting if there is a audio signal going in one direction on a circuit, and then inserting a great deal of toss in the other direction. Usually the echo suppressor at the far-end of the circuit adds this loss when it detects audio coming from the near-end of the circuit. This added loss prevents a speaker, located at the near end, from hearing his/her own voice.

The adaptation mechanism is designed to provide a quick convergence of the filters to an acceptable quality. Once the optimal filter values are reached, there is no need of adaptation, unless there is a modification of the echo.

FIG. 3 represents a block diagram of an embodiment EC2 of the echo canceller according to the invention. This embodiment comprises:
  An input receiving a signal TXi to be transmitted from a near end terminal to a far end terminal.
  An output sending a signal TXo to the far end speaker, this signal being identical to the signal TXI received from the near end terminal.
  An input receiving a signal RXi from the far end terminal, this signal being composed of a vocal signal captured by the far end terminal and an echo originating from the near end terminal and coming back via the far end terminal.
  An output supplying a signal RXo, to the near end terminal, wherein the echo has been attenuated.
  A splitter device SP1 for separating the signal TXi into two signals TH and TL respectively corresponding to a higher sub-band (50-4000 Hz in this example) and a lower sub-band (4000-7500 Hz in this example).
  Two adaptive filters AL and AH for filtering respectively the two signals TH and TL, and supplying filtered signals FTL and FTH respectively corresponding to the lower sub-band and the higher sub-band.
  A splitter device SP2 for separating the signal RXi into two signals RH and RL respectively corresponding to the higher sub-band and the lower sub-band.
  A first subtractor SH for subtracting the signal FTH from the signal RH, the resulting signal being a corrected signal CRH for the higher sub-band.
  A second subtractor SL for subtracting the signal FTL from the signal RL, the resulting signal being a corrected signal CRL for the lower sub-band.
  A first non linear processor/echo suppressor NLPH-ES for processing the signal CRH, receiving the signal TH and the corrected signal CRH, and supplying a processed corrected signal CRH' for the higher sub-band.
  A second non linear processor NLPL for processing the signal CRL and supplying a processed corrected signal CRL' for the lower sub-band.
  A classical mixer device MX for constituting the signal RXo by up-sampling, combining, and smoothing the two processed corrected signals CRH' and CRL'.
  A control module CH supplying commands to the filter AH and to the non linear processor NLPH-ES.
  A control module CL supplying commands to the filter AL and to the non linear processor NLPL.
  A register STH receiving the current status of the filter AH, for the higher sub-band.
  A register STL receiving the current status of the filter AL, for the lower sub-band.
  A control module CTR receiving a signal from the register STH and a signal from the register STL, and supplying a signal SCMD to the control modules CL and CH.
  A classical talk detector DTD, receiving the signal RL supplied by the splitter SP2 and the signal TL supplied by the splitter SP1, for the lower sub-band, and supplying to the register STL a signal indicating whether the received signal RXi represents: a double talk, a single talk, or no talk.

The splitter device SP1, the splitter device SP2, and the mixer device MX are similar to those known and described with reference to FIG. 1.

The register STL provides, to the control unit CTR, a signal comprising the following information:
  Double Talk, or Single Talk, or No Talk.
  Current filter quality (the enhancement of the filter in measured in dB: difference between CRL and RL during far end user single talk) for the lower sub-band.
  Current estimated delay of the echo (between signals TXo and RXi)
  Current estimated ERL (Echo Return Loss: difference between TL and RL when far end user is speaking alone). This estimation could vary during the communication if the echo varies. It will be used in the higher sub-band processing to speed up the convergence, if needed. It will be also used by the non linear processor/echo suppressor NLPH-ES to set a threshold for energy comparison when it is used as an echo suppressor.

The register STH provides, to the control unit CTR, the following information:
  Current filter quality (the enhancement of the filter in measured in dB: difference between CRH and RH during far end user single talk) for the higher sub-band.
  Current estimated ERL in the High Band (Echo Return Loss: difference between TH and RH when far end user is speaking alone).

The information provided by the registers STH and STL is used by the control module CTR to generate the signal SCMD supplied to the control modules CL and HL, respectively for controlling the adaptations of the filters AL and AH for the lower sub-band and the higher sub-band.

The signal SCMD comprises the following information:
  A command to enable or disable adaptation (The control module CTR uses the status of the filters AL and AH to make a decision: enable or disable adaptation).
  Gain of the adaptation.
  Current estimated ERL.
  Estimated delay and estimated depth of the echo: They are used to focus higher sub-band echo processing on the characteristics of echo already found by the lower sub-band echo processing. So, it also saves computation, because no extra MIPS are used to estimate characteristics the echo again.
  A binary command to choose the mode of the non linear processor/echo suppressor NLPH-ES: classical mode or echo suppressor mode.
  Status of filter quality (the enhancement of the filter in measured in dB).

The control module CL uses the information of the signal SCMD for generating a signal for by-passing or not the non linear processor NLPL, and for generating a signal controlling the filter AL:
- To enable or disable adaptation in the filter AL.
- To set the gain of the adaptation in the filter AL (This gain has a critical impact on the quality of the filter and on convergence speed).

The control module CH uses the information of the signal SCMD for generating a signal for selecting the mode of the non linear processor/echo suppressor NLPL-ES, and for generating a signal controlling the filter AH:
- To enable or disable adaptation in the filter AH.
- To set the gain of the adaptation in the filter AH (This gain has a critical impact on the quality of the filter and on convergence speed).

According to a basic implementation of the control module CTR, there are two phases:

1) During a convergence phase, the adaptation of the adaptive filter AL for the lower sub-band is controlled by the corrected signal CRL so that the corrected signal CRL is minimized, i.e. so that the echo is minimized in the tower sub-band; and the adaptation of the adaptive filter AH for the higher sub-band is inhibited. This filter AH is blocked. The non linear processor/echo suppressor NLPH-ES is controlled by a binary control signal supplied by the control module CH so that it behaves like a mere echo suppressor: It receives the signals TH and CRH corresponding to the higher sub-band. It compares the energy of the signal TH and the energy of the signal CRH with a variable threshold ESTH. In order to suppress the echo, it suppresses the signal CRH if the energy of the signal TH is greater than the energy of the signal CRH plus the threshold ESTH. In this phase FTH=0 and CRH=RH 2) After the convergence phase, the two adaptive filters AL and AH, and the non linear processor/echo suppressor NLPH-ES, are respectively controlled by the corrected signal CRL and CRH so that these corrected signals are minimized, and the i.e. so that the echo is minimized in both sub-bands. The non linear processor/echo suppressor NLPH-ES is controlled by the binary control signal supplied by the control module CH so that it behaves like a classical non linear processor associated to an adaptive filter.

According to a more elaborated implementation of the control module CTR, there are five successive phases with different adaptation modes. However, the control means module CTR control the adaptation of the lower sub-band adaptive filter AL and the adaptation of the higher sub-band adaptive filter HL so that these two adaptations are never simultaneous:

a) Initialization Phase:
Lower sub-band filtering is active. The adaptation of the filter AL is permanently enabled. The filter AL is only adapted according to the information (Double Talk, or Single Talk, or No Talk) supplied by the talk detector DTD.

Higher sub-band filtering is permanently disabled. The adaptation of the filter AH is disabled. The non linear processor/echo suppressor NLP_ES is in echo suppressor mode. The threshold ESTH is set at 6 dB for instance (Value supplied at initialization of suppressor mode).

Then the control module CTR unit switches to a "lower sub-band echo cancellation convergence" phase.

b) Lower Sub-Band Echo Cancellation Convergence Phase:
The lower sub-band filtering is active. The adaptation of the filter AL is permanently enabled. The filter AL is adapted according to the information (Double Talk, or Single Talk, or No Talk) supplied by the talk detector DTD.

The higher sub-band filtering is permanently disabled. The non linear processor/echo suppressor NLP_ES is in echo suppressor mode. The threshold ESTH is updated according to the estimated ERL, according to the formula:

$ESTH$=Estimated ERL−Marge(Marge=1 dB for example)

This phase lasts until the quality of lower sub-band filtering reaches a first threshold QTH1 (For instance 15 dB), i.e. when:
The energy of the signal TL has become greater than the energy of the signal CRL plus a quality threshold QTH1, and the echo has been located (Example: The filter AL has determined that the delay is equal to 5 ms, and the depth is equal to 16 ms).

Then the control module CTR switches to an "alternative adaptation" phase.

c) Alternative Adaptation Phase:
In this phase, the adaptations of filters AL and AH are both enabled, but not at the same time. Preferably, the adaptation of the lower sub-band echo cancellation is enabled 3 times out of 4, and the adaptation of the higher sub-band echo cancellation is enabled once out of 4.

The higher sub-band filtering is active in a time window where echo is located (Example: if delay found by lower sub-band filter AL is 5 ms, and depth is 16 ms, then filter coefficients from 40 to 167 are activated). The non linear processor/echo suppressor NLP_ES is in echo suppressor mode. Its threshold is ESTH=Estimated ERL−Marge.

The control module CTR unit switches to a "High Band echo convergence" phase when the quality of the lower sub-band filtering reaches a second threshold QTH2:

Energy of $TL$>Energy of $CRL+QTH2$ (For instance, $QTH2$=20 dB)

d) High Sub-Band Echo Convergence Phase:
The lower sub-band filtering is active on the window where echo is located. But its adaptation is permanently disabled.

The higher sub-band filtering is active on the window where echo is located (Example: if the delay found by the lower sub-band filter AL is 5 ms, and depth is 16 ms, then filter coefficients from 40 to 167 are activated). Its adaptation is permanently enabled.

The non linear processor/echo suppressor NLP_ES is still in echo suppressor mode.

$ESTH$=Estimated ERL−Marge

When the quality of higher sub-band filtering reaches the second threshold (QTH2), the control module CTR unit switches to a "quality optimization" phase:

Energy of $TH$>Energy of $CRH+QTH2$ (For instance, $QTH2$=20 dB)

e) Quality Optimization Phase:
The lower sub-band filtering and the higher sub-band filtering are both active on the window where echo is located. The lower sub-band filtering adaptation is enabled for 1 signal sample out of 2. When the quality of the lower sub-band filtering quality reaches a third threshold QTH3 (For instance 24 dB), the lower sub-band filtering adaptation is frozen.

The higher sub-band filtering adaptation is enabled on the other sample. When the quality of the higher sub-band filtering reaches the third threshold QTH3 (For instance 24 dB), then the higher sub-band filtering adaptation is frozen.

If the characteristics of echo change, while the adaptation is frozen for one of the filters AL and HL, then the control unit CTR unit switches back to the phase "Lower sub-band echo convergence".

What is claimed is:

1. A wide band echo canceller comprising:
a first splitter configured to split a signal transmitted from a near end terminal to a far end terminal, into a first sub-sampled signal corresponding to a higher frequency sub-band of the signal transmitted to the far end terminal, and a second sub-sampled signal corresponding to a lower frequency sub-band of the signal transmitted to the far end terminal,
a second splitter configured to split a signal received from a far end terminal into a third sub-sampled signal corresponding to a higher frequency sub-band of the signal received from the far end terminal, and a fourth sub-sampled signal corresponding to a lower frequency sub-band of the signal received from the far end terminal,
a first adaptive filter configured to filter the second sub-sampled signal to supply a first filtered signal,
a second adaptive filter configured to filter the first sub-sampled signal to supply a second filtered signal,
a first unit configured to subtract the first filtered signal from the fourth sub-sampled signal to supply a first corrected signal,
a second unit configured to subtract the second filtered signal from the third sub-sampled signal to supply a second corrected signal, the first and second corrected signals being used to control the first and second adaptive filters,
a first and second non-linear processors configured to respectively process the first and the second corrected signals and supply a first and second processed corrected signals respectively corresponding to the lower and the higher frequency sub-bands,
a mixer configured to mix the first and second processed corrected signals and up-sample a resulting mixed signal, in order to form an output signal to be supplied to the near end terminal, and
a controller configured to control the first adaptive filter and the second adaptive filter so that the first and second adaptive filters are not simultaneously active, by
controlling the first adaptive filter during a time for the first adaptive filter to converge to a quality level,
preventing activation of the second adaptive filter during the time, and
activating the second adaptive filter as soon as the first adaptive filter has converged to the quality level.

2. The wide band echo canceller according to claim 1, wherein said controller is configured to,
control the first and second adaptive filters in an initialization phase, wherein
the first adaptive filter is enabled, and
the second adaptive filter is disabled;
control the first and second adaptive filters in a lower sub-band echo cancellation convergence phase, wherein
the first adaptive filter is enabled,
the second adaptive filter is disabled until a quality of lower sub-band filtering reaches a first threshold;
control the first and second adaptive filters in an alternate adaptation phase, wherein
the first adaptive filter and the second adaptive filter are both enabled, but not at the same time, until the quality of the lower sub-band filtering reaches a second threshold;
control the first and second adaptive filters in a high sub-band echo convergence phase, wherein
the first adaptive filter is disabled,
the second adaptive filter is enabled until the quality of the higher sub-band filtering reaches the second threshold;
control the first and second adaptive filters in a quality optimization phase, wherein
the first adaptive filter is enabled one signal sample out of two, until the quality of the lower sub-band filtering reaches a third threshold, followed by the lower sub-band filtering being frozen,
the second adaptive filter is enabled on the other signal sample, until the quality of the higher sub-band filtering reaches the third threshold, followed by the higher sub-band filtering being frozen.

3. The wide band echo canceller according to claim 1, wherein said controller is configured to,
control the first adaptive filter for three signal samples out of four, and
enable the second adaptive filter for one signal sample out of the four.

4. The wide band echo canceller according to claim 1, wherein the second adaptive filter is replaced by an echo suppressor as long as the second adaptive filter is disabled.

5. The wide band echo controller of claim 1, wherein the second non-linear processor processes the second corrected signal by,
comparing the first sub-sampled signal and the second corrected signal with a threshold, and
suppressing the second corrected signal if an energy level of the first sub-sampled signal is greater than a sum of an energy level of the second corrected signal and the threshold.

* * * * *